United States Patent
Page, II

(10) Patent No.: US 9,117,607 B2
(45) Date of Patent: Aug. 25, 2015

(54) MUFFLER FOR ENHANCED ARC PROTECTION

(71) Applicant: Schneider Electric USA, Inc., Palatine, IL (US)

(72) Inventor: Frank Michael Page, II, Easley, SC (US)

(73) Assignee: SCHNEIDER ELECTRIC USA, INC., Palatine, IL (US)

( * ) Notice: Subject to any disclaimer, the term of this patent is extended or adjusted under 35 U.S.C. 154(b) by 269 days.

(21) Appl. No.: 13/715,461

(22) Filed: Dec. 14, 2012

(65) Prior Publication Data

US 2014/0166623 A1  Jun. 19, 2014

(51) Int. Cl.
*H01H 33/53* (2006.01)
*H01H 9/34* (2006.01)

(52) U.S. Cl.
CPC ............... *H01H 33/53* (2013.01); *H01H 9/341* (2013.01)

(58) Field of Classification Search
CPC .............. G06F 1/20; H02B 7/01; H02B 1/56; H01H 33/53; H01H 33/0211
USPC .................... 218/147–151, 155–158, 34–38; 361/676, 678, 690, 605
See application file for complete search history.

(56) References Cited

U.S. PATENT DOCUMENTS 6,960,736 B1 * 11/2005 Bach et al. ................. 218/155
6,977,354 B1 * 12/2005 Shea et al. .................. 218/157
7,674,996 B2 * 3/2010 Shea et al. ................... 218/34
7,778,013 B2    8/2010 Burski et al.

* cited by examiner

*Primary Examiner* — Amy Cohen Johnson
*Assistant Examiner* — Marina Fishman
(74) *Attorney, Agent, or Firm* — Locke Lord LLP

(57) ABSTRACT

A muffler for enhanced arc protection is described. In the case of an internal arc event in an electrical enclosure, the muffler exhausts arc gas and plasma parallel to the enclosure surface, instead of directly forward where persons may be located. The muffler includes perforated plates and baffle plates in its interior space. The perforated plates have offset perforation patterns from one another, and the baffle plates are provided on opposing walls, causing the plasma and gas to make multiple directional changes. The perforated plates also filter the arc gas and plasma. These directional changes and filtering result in an energy reduction from the exhaust, which provides an increased margin of safety. In addition, the muffler provides an adequate level of ventilation in the enclosure, thus keeping the components cool.

21 Claims, 14 Drawing Sheets

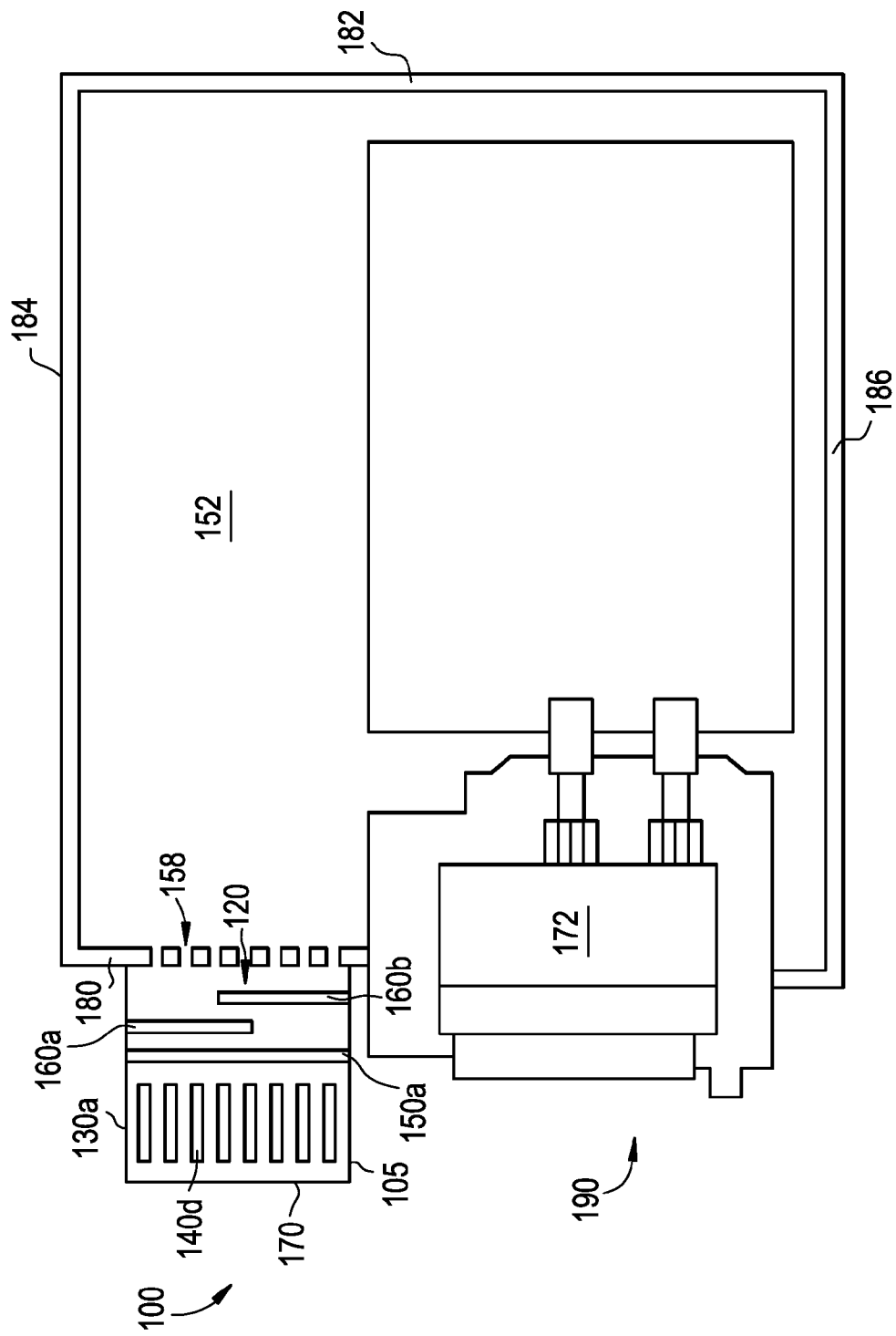

250a  250b 255a  255b

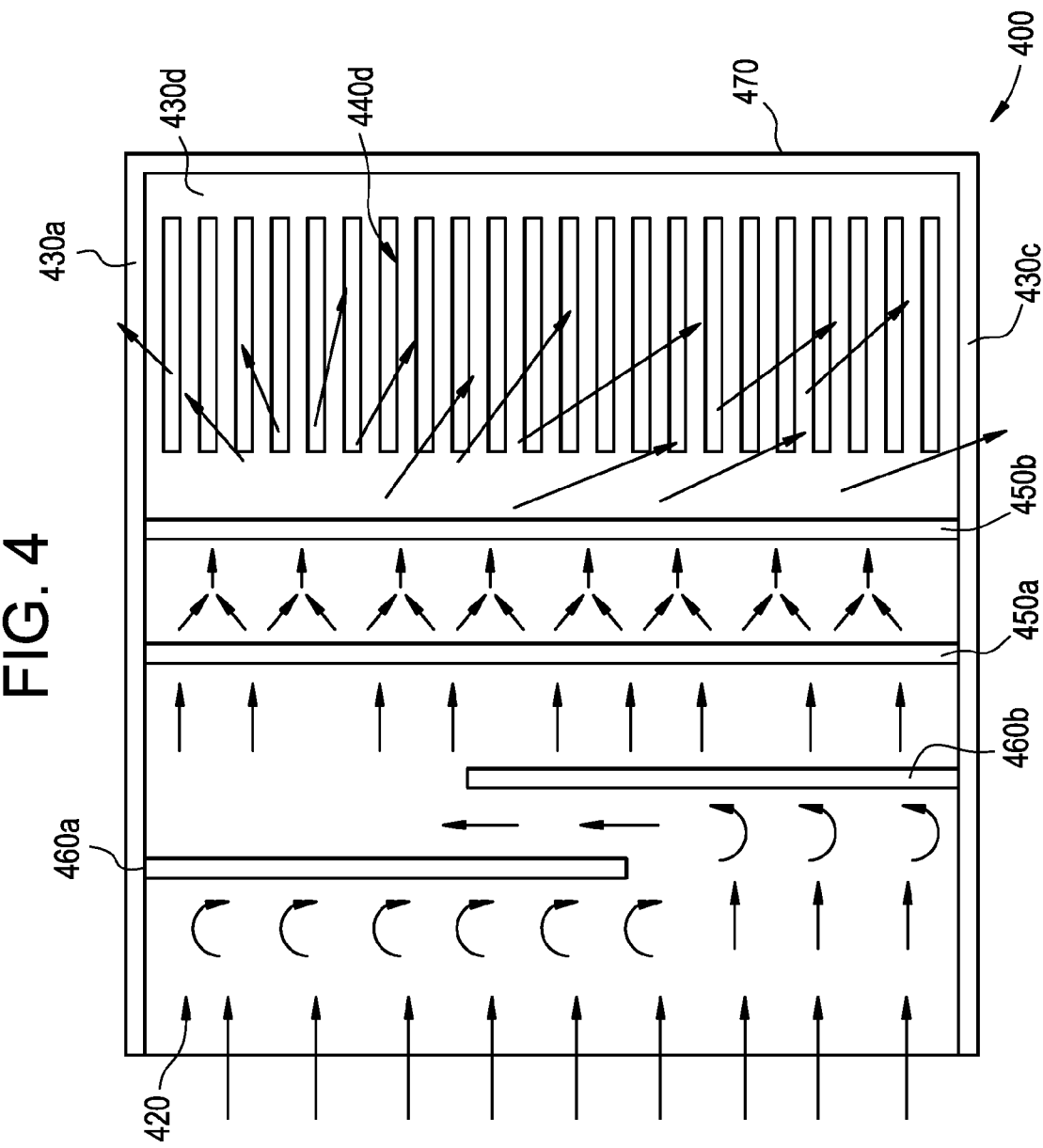

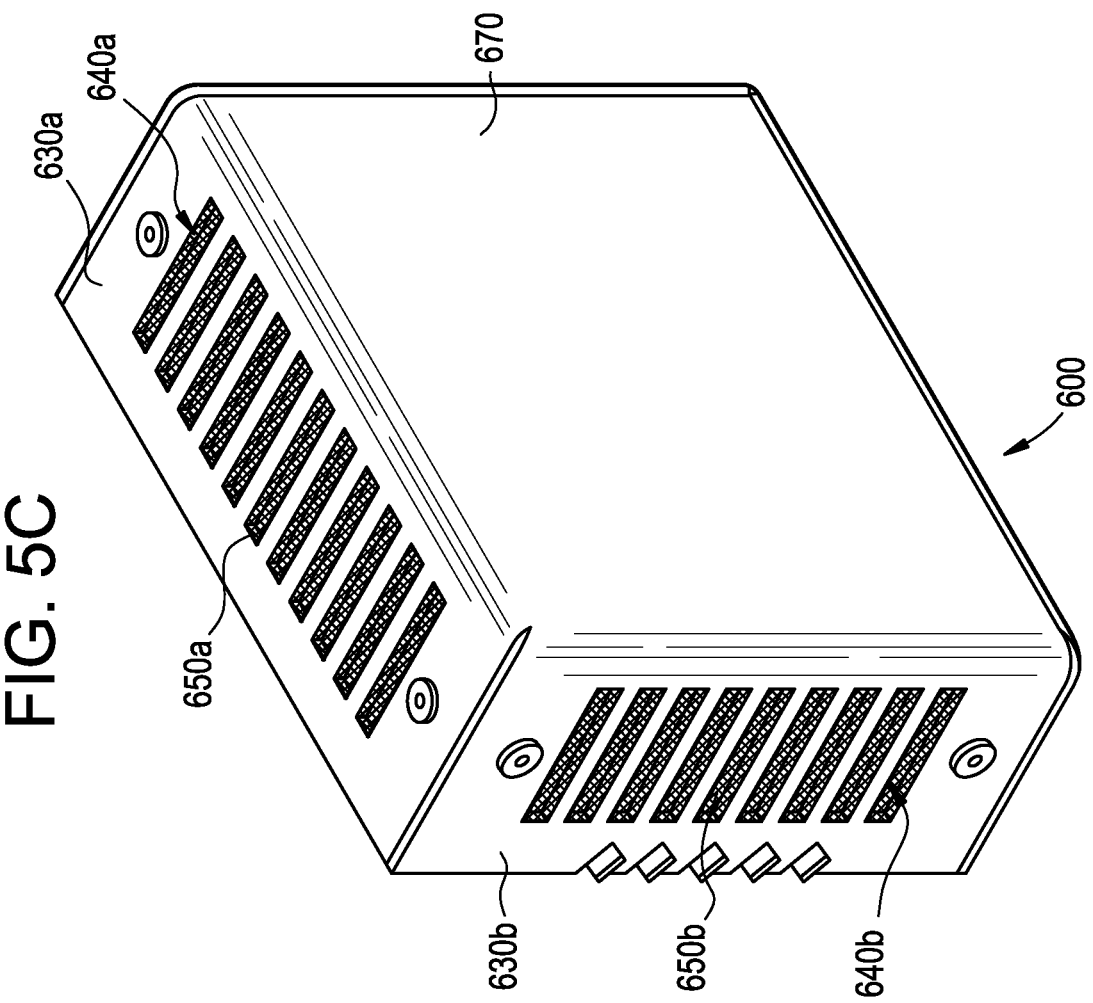

MUFFLER FOR ENHANCED ARC PROTECTION

BACKGROUND OF THE INVENTION

1. Field of the Invention

The present invention relates to a muffler for electrical equipment enclosures, and in particular, to a muffler for enhanced arc protection configured to exhaust arc gas and plasma away from electrical equipment.

2. Description of Related Art

Switchgear enclosures are commonly employed in electrical power distribution systems for enclosing circuit breakers and other switching equipment associated with the distribution system. Typically, switchgear enclosures are comprised of a number of individual stacked or adjacent compartments, and receive electrical power from a power source and distribute the electrical power through one or more feeder circuits to one or more loads. Switchgear enclosures typically include circuit protection devices for interrupting electric power in a particular feeder circuit in response to hazardous current overloads in the circuit. A circuit protection device in electrical equipment can be a circuit breaker, fuse and switch combination, contactor and fuse combination or any other device intended to break or protect the load or secondary side of a circuit.

Switchgear or switchgear cabinet is a general term for an electrical enclosure encompassing switching and interrupting devices and their combination with associated control, instruments, metering, protective and regulating devices, and assemblies of these devices with associated interconnections, accessories, and supporting structures used primarily in connection with the generation, transmission, distribution, and conversion of electric power. Switchgear characteristics are described in ANSI/IEEE (American National Standards Institute/Institute of Electrical and Electronics Engineers) Standard No. C37.20.1, C37.20.2, C37.20.3-1999. However, embodiments of the present invention can be used in many other types of electrical equipment where arc resistance is required.

The specified temperature limits applicable to switchgear assemblies are given in the above referenced standards. The rated continuous current of metal-enclosed (ME) switchgear is the maximum current that can be carried continuously by the primary circuit components, including buses and connections, without producing a temperature in excess of specified limits for any primary or secondary circuit component, any insulating medium, or any structural or enclosing member. The continuous current ratings of the main bus in ME switchgear are also defined by the above referenced standards. The short-time current ratings of the individual circuit-breaker compartments of ME switchgear are equal to the short-time ratings of the switching and protective devices used, or the short-time rating of the current transformers (see ANSI/IEEE C57.13-1993).

In addition to current overloads, switchgear enclosures may encounter other hazardous conditions known as arcing faults. Arcing faults occur when electric current "arcs," flowing through ionized gas between conductors, such as between two ends of broken or damaged conductors, or between a conductor and ground in a switchgear enclosure. Arcing faults typically result from corroded, worn or aged wiring or insulation, loose connections and electrical stress caused by repeated overloading, lightning strikes, etc. During an internal arc event in an electrical enclosure, conductors and surrounding material are vaporized and converted to plasma and arc gas. The massive rate of expansion of the plasma and arc gas generates high pressure inside the equipment. As a result of the high pressures generated, the door/cover, hinges and latching means are placed under significant stress. If the door/cover, hinges and latching means should yield and deform, personnel outside the equipment would be exposed to dangerous levels of energy. In other words, the ionized gases associated with arcing faults may be released at pressures and temperatures sufficient to damage the switchgear equipment and cause deadly harm to anyone in close proximity.

Presently, the most commonly employed method for enhancing the durability of switchgear enclosures in the event of arcing faults is to provide arc-resistant switchgear that meets switchgear standards, with a means for venting the gases from the compartment in which an arcing fault occurs. These compartments are designed to withstand the pressures and temperatures of the gases associated with an arcing fault and reduce the likelihood or extent of damage to the switchgear. This control of the explosion exhaust is what provides the increased safety to personnel working around the equipment. In some instances, electrical equipment contains components that require external ventilation openings in the equipment enclosure. During an arc event in such an enclosure, the ventilation openings provide a means for the dangerous energy to propagate outside the equipment, and could provide exposure to personnel standing in front of the equipment.

SUMMARY OF THE INVENTION

Thus, there exists a need in the art for a means of providing an adequate level of ventilation in the enclosure to keep the components cool (therefore preventing premature end-of-life), while at the same time providing a solution that prevents dangerous levels of energy from propagating outside the equipment. Aspects and embodiments disclosed herein meet these needs and others by providing a muffler for enhanced arc protection.

In view of the foregoing, one aspect of the present invention provides a muffler for enhanced arc protection that, in the case of an internal arc event, exhausts arc gas and plasma parallel to the surface of the electrical enclosure, instead of directly forward where persons may be located. The muffler includes perforated plates and baffle plates in its interior space. The perforated plates have offset perforation patterns from one another, and the baffle plates are provided on opposing walls, causing the plasma and gas to make multiple directional changes. The perforated plates also filter the arc gas and plasma. These directional changes and filtering result in an energy reduction from the exhaust, which provides an increased margin of safety.

The muffler may be in the form of a modular box that mounts to an electrical enclosure door/cover, allowing the controlled expansion of the arc gas and plasma. The controlled expansion includes pressure relief that reduces the stress on the door/cover, hinges and latches. Reduced stress on these components results in less deformation. In turn, less deformation translates into a better seal and prevention of uncontrolled release of arc gas and plasma. In addition, the muffler allows good ventilation of the enclosure for components that require cooling.

Still other aspects, features and advantages of the present invention are readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1A is a side cutaway view of a low voltage switchgear incorporating a muffler for enhanced arc protection according to an embodiment of the invention.

FIG. 4 is a cutaway view of a muffler for enhanced arc protection according to another embodiment of the invention.

FIG. 5C is a front perspective view of the muffler for enhanced arc protection illustrated in FIGS. 5A or 5B.

DETAILED DESCRIPTION

Figure 1B:
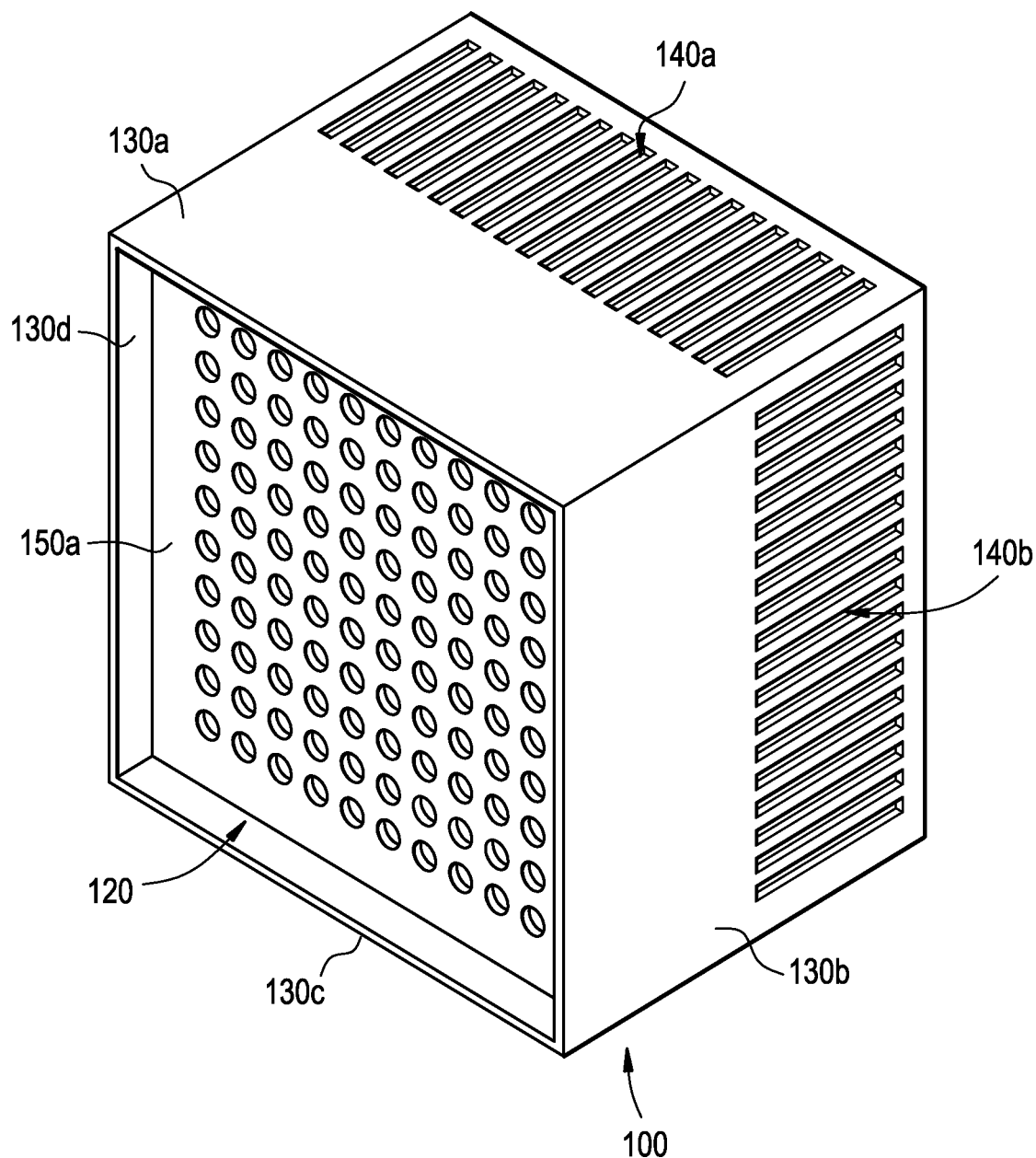
FIG. 1B is a rear perspective view of the exterior of a muffler for enhanced arc protection according to an embodiment of the invention.

A muffler for enhanced arc protection is described. In the following description, for purposes of explanation, numerous specific details are set forth in order to provide a thorough understanding of the exemplary embodiments. It is apparent to one skilled in the art, however, that the present invention can be practiced without these specific details or with an equivalent arrangement.

Referring now to the drawings, wherein like reference numerals designate identical or corresponding parts throughout the several views, FIG. 1A is a side cutaway view of a low voltage switchgear cabinet 190 incorporating a muffler 100 for enhanced arc protection according to an embodiment of the invention. The muffler 100 is configured to exhaust arc gas and plasma away from the switchgear cabinet 190 in the case of an arc event internal to the switchgear cabinet 190. The switchgear cabinet 190 includes a front door or panel 180, through which an electronic circuit protection device, such as a circuit breaker 172, is accessible from outside the switchgear cabinet 190. The switchgear cabinet 190 also includes a rear wall 182 opposite the front panel 180, and a top wall 184 opposite a bottom wall 186. The panel 180 and the walls 182, 184, 186 define an interior or inner volume 152 inside of which the circuit breaker 172 is housed. An operator or installer typically stands in front of the front door or panel 180 of the switchgear to operate or install the circuit breaker 172 (of which there may be more than one), and thereby places himself or herself in a pathway of dangerous arc gas or plasma that tries to exit the switchgear cabinet 190, typically wherever it finds an opening, however slight, such as around the circuit breaker 172.

The muffler 100 is in the form of a modular box that abuts against an opening 158 of a door or panel 180 of the switchgear cabinet 190. Thus, vent openings 140d are positioned such that exiting arc gas and plasma is directed in a direction along (i.e., parallel to) the door or panel 180, allowing the controlled expansion of the arc gas and plasma. The controlled expansion includes pressure relief that reduces the stress on the door or panel 180, the switchgear cabinet 190, and its hinges and latches (not shown). Reduced stress on these components results in less deformation. In turn, less deformation translates into a better seal and prevention of uncontrolled release of arc gas and plasma. In addition, the muffler 100 allows ventilation of the enclosure for components that require external cooling.

The muffler 100 comprises a housing 105 having an inlet 120, a solid front wall 170 opposite the inlet 120, and a plurality of sidewalls 130a,b,c,d that define an interior space of the housing 105. The inlet 120 is configured to receive arc gas and plasma exiting the switchgear cabinet 190 to which the muffler 100 is mounted. The housing 105 of the muffler 100 in this illustrated example is separate and distinct from the front panel 180 and the walls 182, 184, 186 of the switchgear cabinet 190. The muffler 100 can be removed from the switchgear cabinet 190.

The muffler 100 further comprises internal obstructions within its interior space 158 that divides the interior space into multiple pathways for changing a direction of travel of the arc gas and plasma entering the inlet 120, and/or filters (e.g., slows down) the arc gas and plasma. These directional changes and filtering result in an energy reduction from the exhaust, which provides an increased margin of safety. In this embodiment, the internal obstructions comprise a perforated plate 150a and baffle plates 160a,b. The perforated plate 150a and baffle plates 160a,b can be arranged in any order one behind another relative to the inlet 120 within the interior space so as to oppose the arc gas and plasma received by the inlet 120. The perforated plate 150a can act as a filter to catch or trap molten debris on its surface and to slow down or take away some of the energy in the gas and plasma passing through the perforated plate 150a.

Referring now to FIG. 1B, at least one of the plurality of side walls 130a,b,c,d comprises a vent opening (such as, for example, the vent openings 140d of side wall 130d) out of which at least some of the arc gas and plasma is exhausted away from the muffler 100. For example, in the case of an internal arc event, the muffler 100 exhausts arc gas and plasma parallel to the surface of the switchgear cabinet 190, instead of directly forward (i.e., out of and perpendicular to the front wall 170) where persons may be located. These vent openings 140 are formed in the side walls 130 of the muffler 100, and a major surface of each of these side walls 130 lies on a plane that is orthogonal to the solid front wall 170 of the muffler 100.

FIG. 1B is a rear perspective view of the exterior of a muffler 100 for enhanced arc protection according to an embodiment of the invention. The exterior of the muffler 100 is a housing comprising a plurality of sidewalls 130a-d, and a solid front wall 170 positioned parallel to the door or panel 180 upon which the muffler 100 is mounted. An inlet 120 is provided opposite to the solid front wall 170 and abutting against the opening in the door or panel 180. The interior space of the muffler 100 comprises one or more obstructions. As shown in FIG. 1B, the obstruction can be, for example, a first perforated plate 150a that substantially or completely covers the inlet 120 and is positioned orthogonally to the sidewalls 130a-d. The first perforated plate 150a may be square or rectangular in shape, or may correspond to the shape of the inlet 120 as shown in FIG. 1B.

One or more of the sidewalls 130a-d may comprise vent openings. For example, in FIG. 1B, the sidewall 130a has vent openings 140a, and the sidewall 130b has vent openings 140b. However, it is contemplated that vent openings may be present in only one of the sidewalls 130a-d, in all of the sidewalls 130a-d, or in any combination of the sidewalls 130a-d. The vent openings 140a,b form a pattern in the sidewalls 130a,b,c,d in which they appear, such as a pattern of spaced-apart elongate openings that extend between the inlet 120 and the solid front wall 170.

Figure 1C:
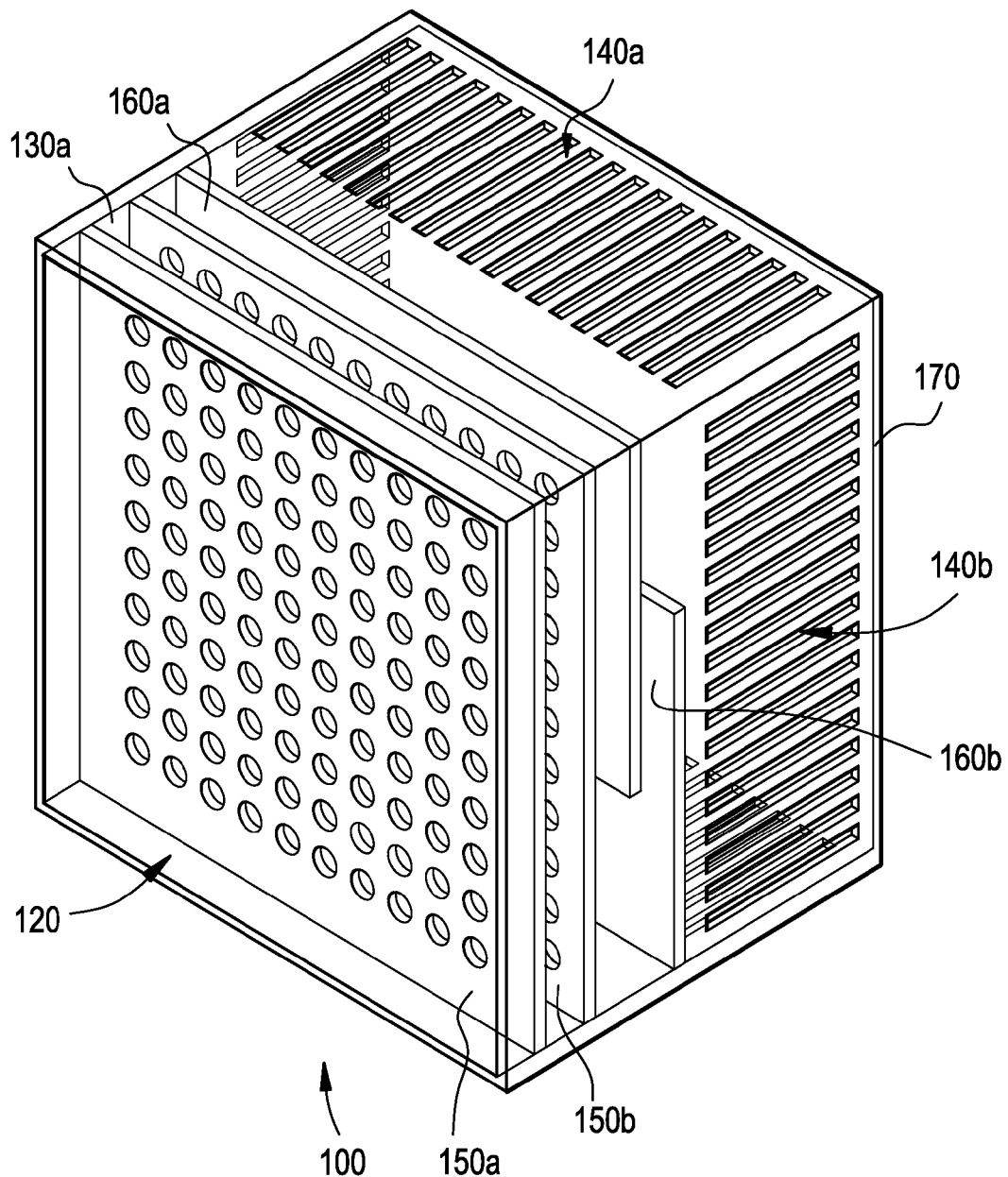
FIG. 1C is a rear perspective view of the interior of the muffler for enhanced arc protection illustrated in FIG. 1B, with the housing made transparent for illustration purposes.

FIG. 1C is a rear perspective view of the interior space of the muffler 100 for enhanced arc protection illustrated in FIG. 1A. In FIG. 1B, the housing of the muffler 100 has been made transparent for illustration purposes. The first perforated plate 150a is exposed to the inlet 120. In this embodiment, additional obstructions are present in the muffler 100, including, in a direction from the inlet 120 to the solid front wall 170, the second perforated plate 150b, the first baffle plate 160a, and the second baffle plate 160b. In other words, the first perforated plate 150a is positioned proximate to the inlet 120 (i.e., between the inlet 120 and the second perforated plate 150b), and the second baffle plate 160b is position proximate to the vent openings 140a and 140b (i.e., between the first baffle plate 160a and the vent openings 140a and 140b). In one embodiment, at least one of the perforated plates 150a-b comprises steel.

However, it is contemplated that the first perforated plate 150a, the second perforated plate 150b, the first baffle plate 160a, and the second baffle plate 160b can be arranged in any order within the interior space of the muffler 100 relative to the inlet 120, as described further herein. In addition, it is contemplated that only one baffle plate and/or perforated plate may be present within the interior space of the muffler 100, or three or more baffle plates and/or perforated plates may be present within the interior space of the muffler 100 in any combination. For example, in one embodiment, a first perforated plate may be positioned proximate to the inlet; a second perforated plate may be positioned proximate to the vent openings; and at least one baffle plate may be positioned therebetween.

In an implementation, the muffler 100 can be mounted over an opening on the exterior surface of an equipment door or panel 180, with the inlet 120 facing the opening. Thus, as used herein, the inlet 120 is at the rear of the muffler 100, which is the part of the muffler 100 that faces the exterior surface of a door or panel 180 (such as shown, for example, in FIG. 1A). The perforated plates 150a and 150b can act as filters to collect large particles of molten material as arc gas and plasma pass through the plates 150a,b during an internal (i.e., inside the equipment) arc event, and to prevent shrapnel from being ejected outside of the equipment. In one embodiment, the first perforated plate 150a has a first perforation pattern that is offset from a second perforation pattern of second perforated plate 150b, as described further herein with respect to FIGS. 2A-2C. In such an embodiment, arc gas and plasma are forced to twist and turn to pass through the perforated plates 150a and 150b, slowing them down and causing them to lose energy before passing the baffle plates 160a and 160b. The baffle plates 160a and 160b further slow the arc gas and plasma down before they pass through the vent openings 140a and 140b.

No openings are present on the solid front wall 170 of the muffler 100. Instead, the vent openings of the muffler 100 are positioned around the perimeter of the housing 105. For example, the vent openings 140a are present in the sidewall 130a, and the vent openings 140b are present in the sidewall 130b. Thus, arc gas and plasma are exhausted parallel to the equipment door or panel 180, instead of perpendicular to the equipment where personnel could be standing. When exhausted in one embodiment, the arc gas and plasma have reduced in energy to the point where they would not ignite flame indicators, per ANSI C37.20.7.

Figure 2A:
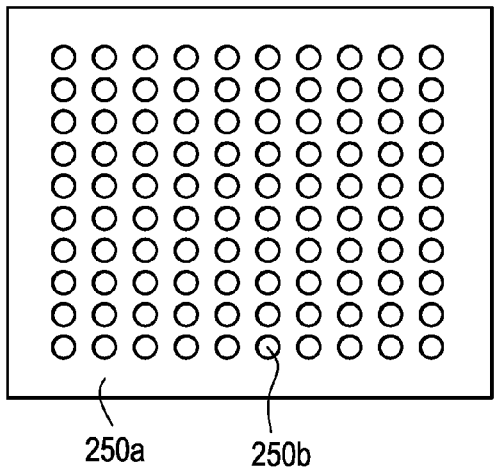
FIG. 2A is a front view of dual perforated plates for a muffler for enhanced arc protection according to an embodiment of the invention.
Figure 2B:
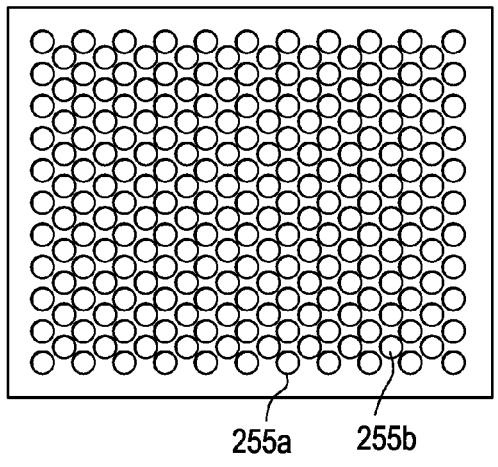
FIG. 2B is a front view of dual perforated plates, with the front plate made transparent for illustration purposes, for a muffler for enhanced arc protection according to an embodiment of the invention.
Figure 2C:
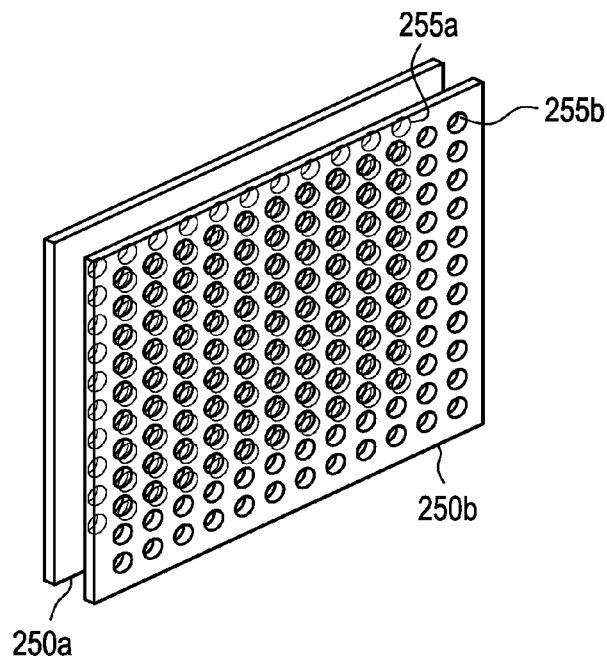
FIG. 2C is a front perspective view of dual perforated plates for a muffler for enhanced arc protection according to an embodiment of the invention.

FIGS. 2A-2C illustrate dual perforated plates that can be implemented within a muffler, such as the muffler 100, according to an embodiment of the invention. For illustration purposes, a first perforated plate 250a has been made transparent in FIGS. 2B and 2C. The first perforated plate 250a has perforations 255a creating a first perforation pattern. A second perforated plate 250b has perforations 255b creating a second perforation pattern. In this embodiment, the first perforation pattern is offset from the second perforation pattern, i.e., the perforations 255a do not align with the perforations 255b along any plane running parallel to any of the sidewalls 130a,b,c,d. Because the first perforation pattern is offset from the second perforation pattern, arc gas and plasma are forced to twist and turn to pass through the patterns, slowing the arc gas and plasma down and causing them to lose energy. In one embodiment, one or both of the perforated plates 250a-b comprises steel.

Although illustrated as being entirely offset from the first perforation pattern, it is contemplated that the second perforation pattern can be either partially offset or not offset from the first perforation pattern. Further, in embodiments in which three or more perforated plates are present within the muffler 100, it is contemplated that every other perforated plate may have similar perforation patterns that are offset from the perforation patterns of the perforated plates positioned therebetween. As the arc gas and plasma move from the inlet 120 toward the solid front wall 170 of the muffler 100, the perforated plates act as obstructions to force the gas and plasma to change direction and to guide the gas and plasma toward the front solid wall 170 before they are exhausted out of the vent openings 140a,b.

Figure 3:
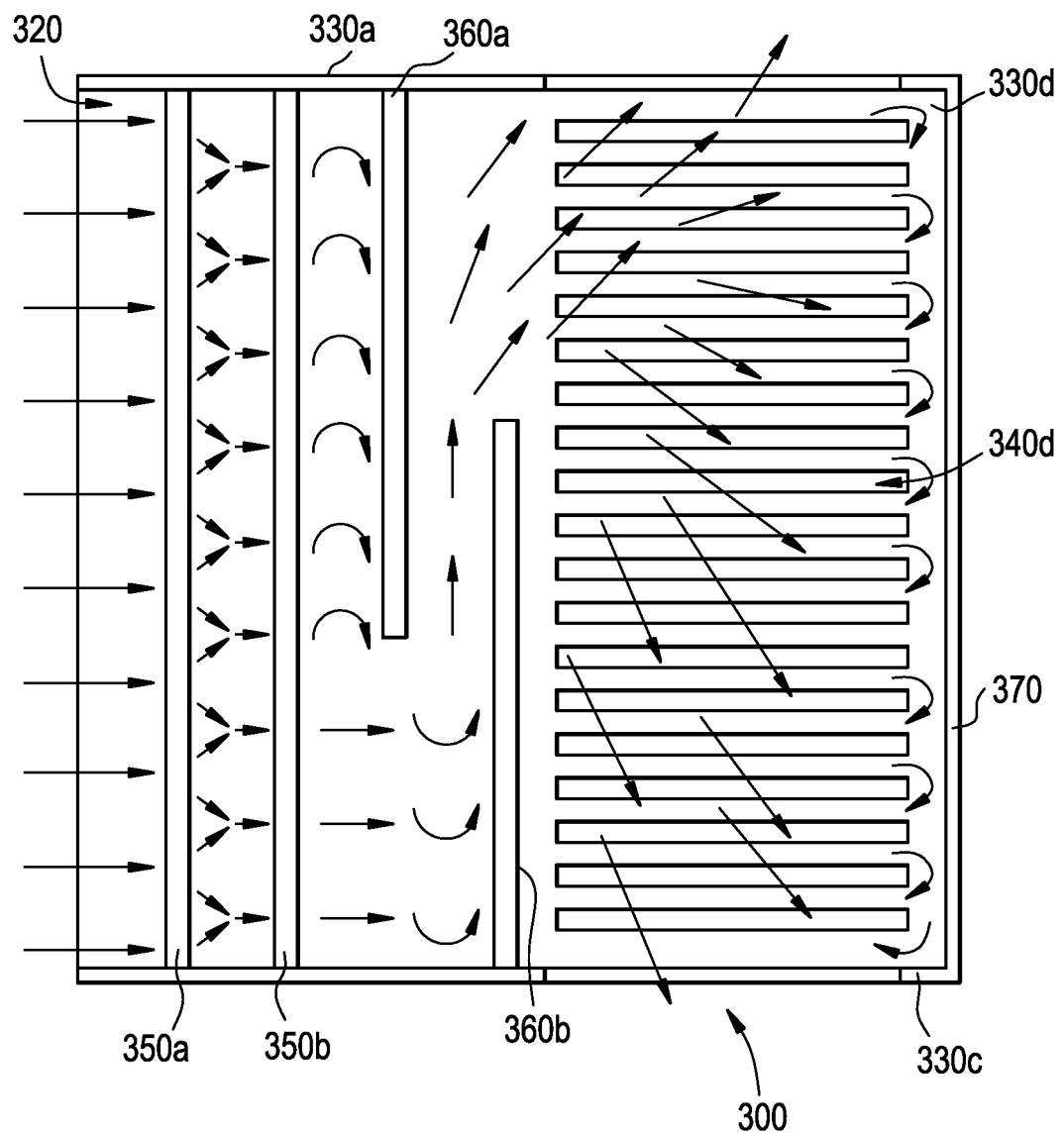
FIG. 3 is a cutaway view of a muffler for enhanced arc protection according to an embodiment of the invention.

FIG. 3 is a cutaway view of a muffler 300 for enhanced arc protection according to an embodiment of the invention, with the arrows indicating directions of travel of exhausting arc gas and plasma. The reference numbers for the muffler 300 have been increased by 200 compared to the same reference numbers in FIGS. 1A-1C, and can designate identical or corresponding parts in FIG. 3. In the case of an arc event internal to the electrical equipment (e.g., the switchgear cabinet 190 of FIGS. 1A-C), arc gas and plasma exit an opening in the cover or door of equipment (not shown), and enter the muffler 300 via an inlet 320. The arc gas and plasma then pass through a first perforated plate 350a and a second perforated plate 350b. In one embodiment, at least one of the perforated plates 350a-b comprise steel. Because the first perforated plate 350a has a perforation pattern that is offset from the perforation pattern of the perforated plate 350b, arc gas and plasma are forced to twist and turn to pass through, slowing them down and causing them to lose energy before passing through a first baffle plate 360a and a second baffle plate 360b.

A first baffle plate 360a and a second baffle plate 360b further slow the arc gas and plasma by causing the arc gas and plasma to change directions in order to exit. As shown in FIG. 3, the first baffle plate 360a is joined to a sidewall 330a, while the second baffle plate 360b is joined to a sidewall 330c. The arc gas and plasma are ultimately exhausted out of the vent openings 340d. The vent openings 340d are present in a sidewall 330d in this embodiment. Additional vent openings may be present in the sidewalls 330a and 330c, but no vent openings are present in the solid front wall 370.

As in FIGS. 1A-1B, the obstructions internal to the muffler 300 are positioned in the following order in a direction from the inlet 320 to the solid front wall 370: the first perforated plate 350a, the second perforated plate 350b, the first baffle plate 360a, and the second baffle plate 360b. In other words, the first perforated plate 350a is positioned proximate to the inlet 320, and the second baffle plate 360b is positioned proximate to the vent openings 340d, with the second perforated plate 350b and the first baffle plate 360a positioned therebetween. However, it is contemplated that the perforated plates 350a-b and the baffle plates 360a-b can be positioned in any other configuration, examples of which are described further herein. In the illustrated example of FIG. 3, the plates 350a,b, 360a,b are arranged in a stacked relationship within the muffler 300 such that respective major surfaces of the plates 350, 360 are parallel to one another and spaced apart relative to one another by the same distances. In this example, the gas and plasma changes direction at least five times from the moment they enter the inlet 320 to being exhausted out of the vent openings 340. Stated differently, the gas and plasma strike at least four different surfaces from the moment they enter the inlet 320 to when they are exhausted out of the vent openings 340.

FIG. 4 is a cutaway view of a muffler 400 for enhanced arc protection according to an embodiment of the invention, with the arrows indicating directions of travel of exhausting arc gas and plasma. The reference numbers for the muffler 400 have been increased by 300 compared to the same reference numbers in FIGS. 1A-1C, and can designate identical or corresponding parts in FIG. 4. This embodiment illustrates an alternative configuration of the obstructions internal to the muffler 400. In the case of an internal arc event, arc gas and plasma exit an opening in the cover or door of the equipment (not shown), and enter the muffler 400 via an inlet 420. The arc gas and plasma are then directed around a first baffle plate 460a and a second baffle plate 460b, slowing them down and causing them to change direction at least twice before passing through a first perforated plate 450a. As shown in FIG. 4, the first baffle plate 460a is joined to a sidewall 440a of the muffler 400, while a second baffle plate 460b is joined to a sidewall 440c of the muffler 400.

In this embodiment, the obstructions internal to the muffler 400 are positioned in the following order in a direction from the inlet 420 to the vent openings 440d: the first baffle plate 460a, the second baffle plate 460b, the first perforated plate 450a, and the second perforated plate 450b. In other words, the first baffle plate 460a is positioned proximate to the inlet 320, and the second perforated plate 450b is positioned proximate to the vent openings 440d, with the second baffle plate 460b and the first perforated plate 450a positioned therebetween. In this example illustrated in FIG. 4, gas and plasma change directions at least twice due to the baffle plates 460a,b prior to passing through the first perforated plate 450a. Unlike the embodiment shown in FIG. 3, in which the gas and plasma first pass through two perforated plates 350a,b, in this example, the gas and plasma pass around two baffle plates 460a,b. Like the muffler 300 shown in FIG. 3, gas and plasma entering the inlet 420 of the muffler 400 shown in FIG. 4 change direction at least five times prior to being exhausted out of the vent openings 440d. Like the muffler 300 shown in FIG. 3, gas and plasma entering the inlet 420 encounter at least four physical obstructions prior to exiting out of the muffler through the vent openings 440d.

Figure 5A:
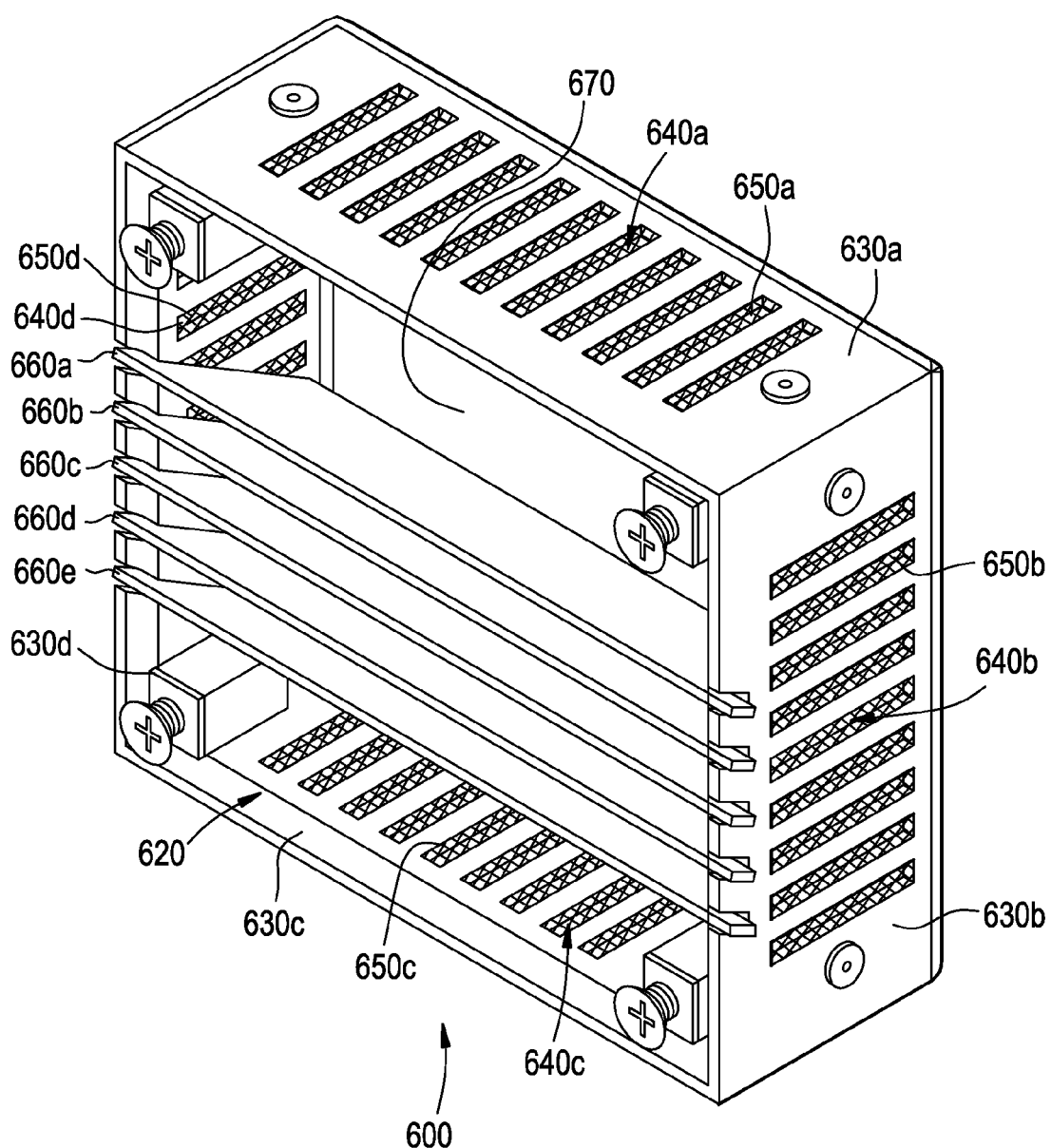
FIG. 5A is a rear perspective view of a muffler for enhanced arc protection according to an embodiment of the invention.

FIG. 5A is a rear perspective view of a muffler 600 for enhanced arc protection according to an embodiment of the invention. In this embodiment, mesh 650a is provided so as to cover the vent openings 640a of a sidewall 630a of the muffler 600; a further mesh 650b is provided so as to cover the vent openings 640b of a sidewall 630b of the muffler 600; a further mesh 650c is provided so as to cover the vent openings 640c of a sidewall 630c of the muffler 600; and a mesh 650d is provided so as to cover the vent openings 640d of a sidewall 630d. No vent openings are provided in a solid front wall 670 of the muffler 600.

In the case of an internal arc event, arc gas and plasma enter the muffler 600 at the inlet 620. Five angled, parallel-spaced, solid baffle plates 660a-e guide the gas and plasma toward the vent openings 640c at the bottom of the muffler 600 and the side vent openings 640b,d. The baffle plates 660a-e are angled at an acute angle (e.g., about 30 degrees) away from a plane that is parallel to the bottom sidewall 630c of the muffler 600. Such an arrangement of the baffle plates 660a-e may be desirable in applications in which greater ventilation of the associated electrical equipment is needed. The arc gas and plasma is ultimately exhausted through the vent openings 640a-d after passing through the meshes 650a-d, respectively. In one embodiment, at least one of the meshes 650a-e comprises steel.

Figure 5B:
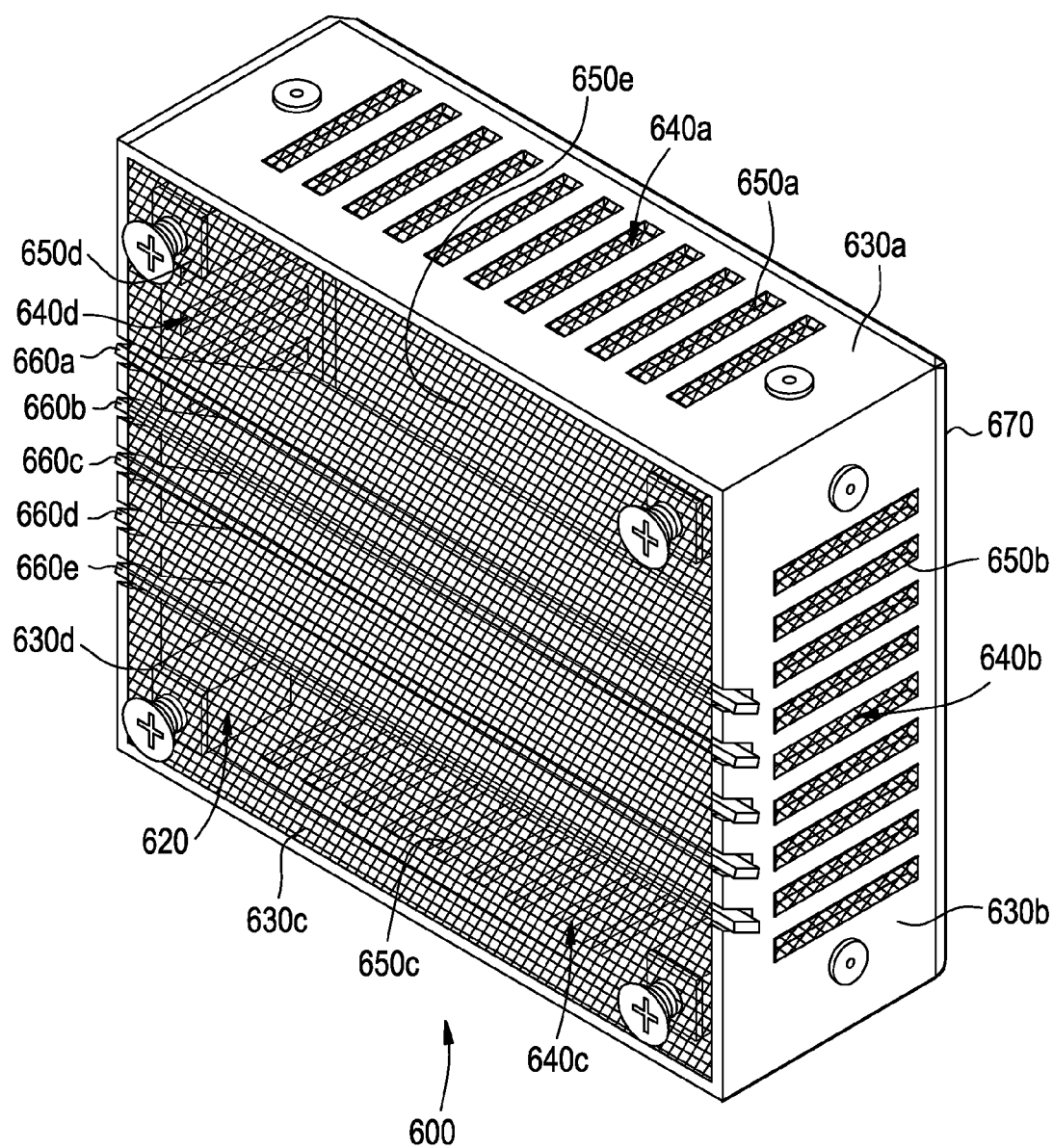
FIG. 5B is a rear perspective view of a muffler for enhanced arc protection according to another embodiment of the invention.

FIG. 5B is a rear perspective view of a muffler 600 for enhanced arc protection according to another embodiment of the invention. In this embodiment, a mesh 650e is provided at an inlet 620 to further slow and filter arc gas and plasma entering the inlet 620 in the case of an arc event. In addition, a further mesh 650a is provided so as to cover the vent openings 640a of a sidewall 630a of the muffler 600; a further mesh 650b is provided so as to cover the vent openings 640b of a sidewall 630b of the muffler 600; a further mesh 650c is provided so as to cover the vent openings 640c of a sidewall 630c of the muffler 600; and a mesh 650d is provided so as to cover the vent openings 640d of a sidewall 630d, as in FIG. 5A. Thus, in the case of an internal arc event, arc gas and plasma enter the muffler 600 at the inlet 620, first passing through the mesh 650e. The arc gas and plasma then proceeds through the muffler 600 as described with respect to FIG. 5A. FIG. 5C is a front perspective view of a muffler 600 according to FIGS. 5A or 5B.

Although shown and described with respect to angled baffle plates 660a-e, it is contemplated that the mesh 650e and/or meshes 650a-d can be similarly implemented with baffle plates perpendicularly oriented with respect to the sidewalls 630a-d (such as shown in FIGS. 1A-C). In addition, although shown and described with respect to meshes 650a-e, it is contemplated that perforated plates comprising holes (such as shown in FIGS. 2A-C) can be similarly implemented at the inlet 620 and/or covering the vent openings 640a-d of the sidewalls 630a-d, respectively.

Figure 6A:
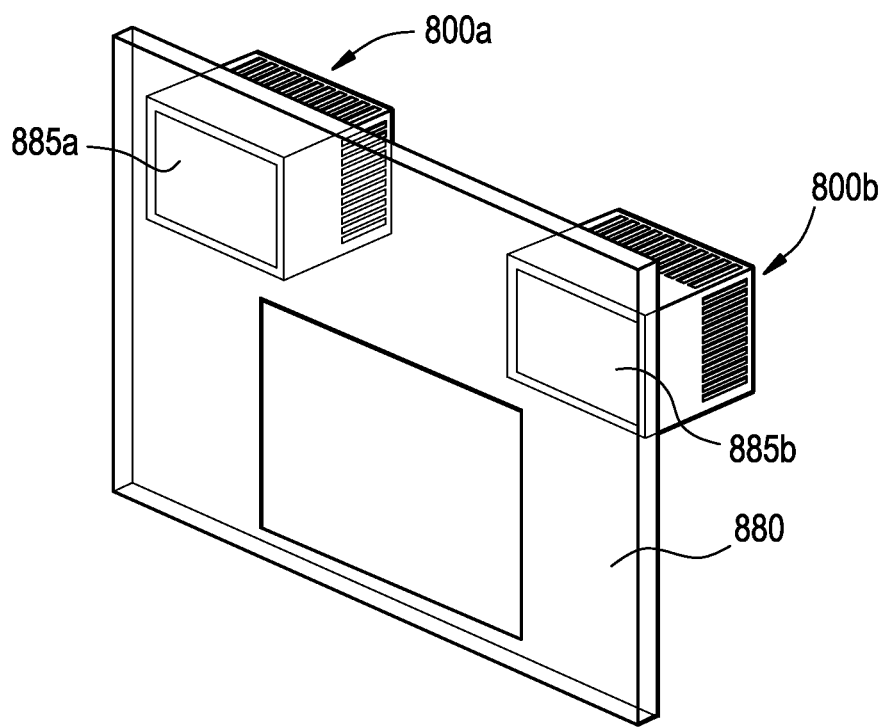
FIG. 6A is a rear perspective view of mufflers for enhanced arc protection mounted to an electrical equipment enclosure door or cover according to an embodiment of the invention.
Figure 6B:
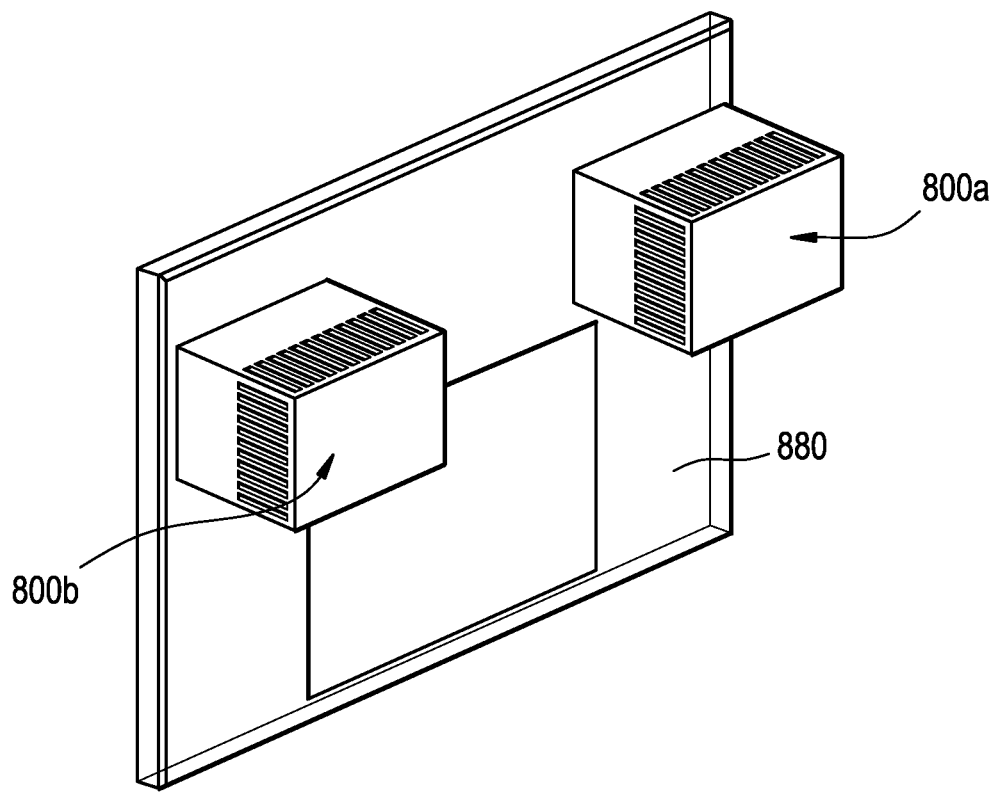
FIG. 6B is a front perspective view of mufflers for enhanced arc protection mounted to an electrical equipment enclosure door or cover according to an embodiment of the invention.
Figure 6C:
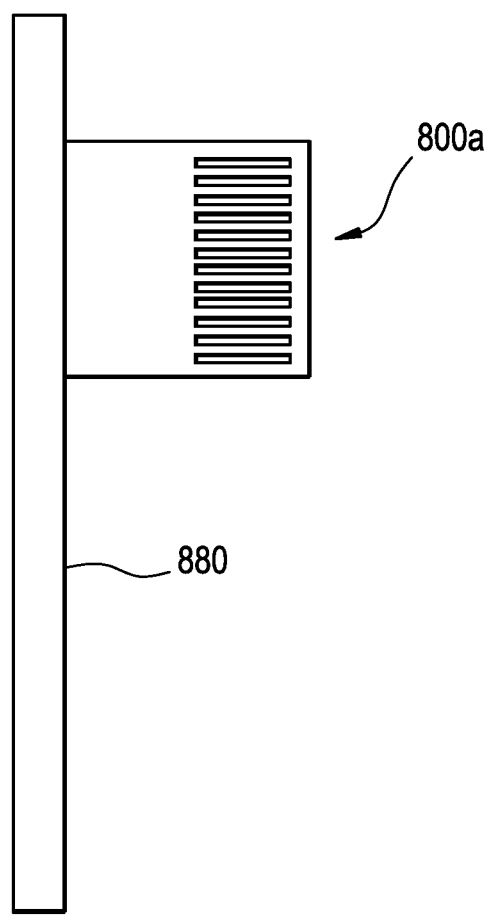
FIG. 6C is a side view of mufflers for enhanced arc protection mounted to an electrical equipment enclosure door or cover according to an embodiment of the invention.

FIGS. 6A-C are rear perspective, front perspective, and side views, respectively, of mufflers 800a-b for enhanced arc protection mounted to a door or cover 880 of an electrical equipment enclosure according to an embodiment of the invention. As illustrated, the mufflers 800a-b are mounted over openings in a door or cover 880 to allow for exhaustion of arc gas and plasma in the case of an internal arc event in the electrical equipment. The mufflers 800a-b can be mounted onto an existing door or cover 880 of an electrical equipment enclosure, or can be manufactured as part of the door or cover 880 of an electrical equipment enclosure. The mufflers 800a-b can be any of the mufflers described herein, such as the muffler 100, 200, 300, 400, 600. The door or cover 880 has one or more openings 885a,b which lead to the inlet, such as the inlet 120, 220, 320, 420, 620, of the muffler, such as the muffler 100, 200, 300, 400, 600. As can be seen from the front perspective view of FIG. 6B, any gas or plasma exhausted through the vent openings of the mufflers 800a,b, would be directed away from a person standing in front of the mufflers 800a,b. The solid front wall, such as the wall 170, 270, 370, 470, 670, stops gas or plasma from exiting the muffler 100, 200, 300, 400, 600 in a direction parallel to the ground on which the person is standing. Instead, any such gas or plasma is safely directed along a plane parallel to the person standing in front of the equipment.

Figure 7:
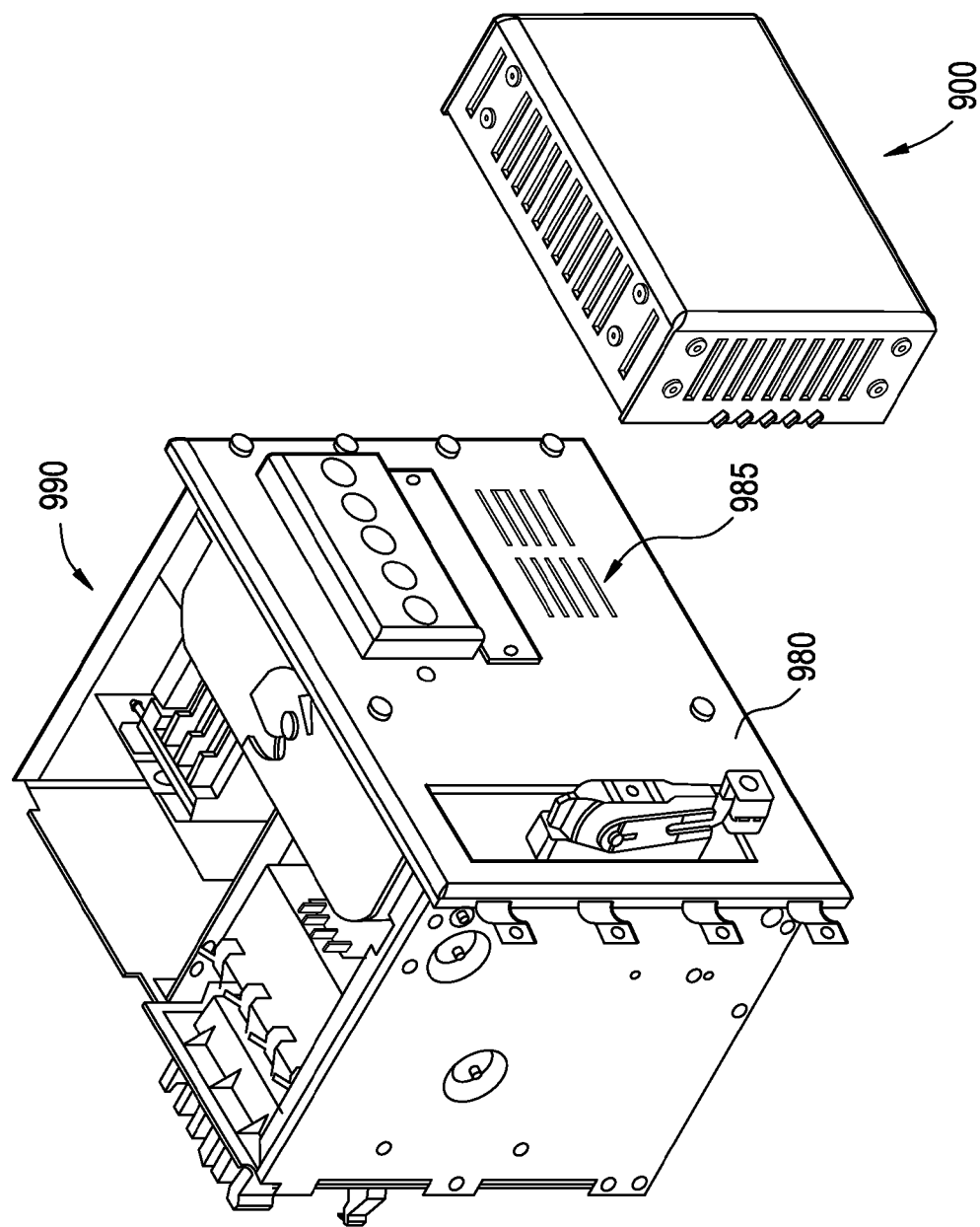
FIG. 7 is a front exploded perspective view illustrating the location of a muffler for enhanced arc protection on an electrical equipment enclosure according to an embodiment of the invention.

Mufflers according to the described embodiments can be mounted over any openings of electrical equipment enclosures. For example, as shown in FIG. 7, the muffler 900 can be mounted over the vent openings 985 of the electrical equipment enclosure 980 of electrical equipment 990, forming part of the front face of the electrical equipment enclosure 980. In this embodiment, the vent openings 985 are intended for forced convective cooling of electrical components internal to the electrical equipment enclosure 980. The muffler 900 will continue to allow ventilation of the electrical equipment enclosure 980 for components that require external cooling.

The mufflers 100, 200, 300, 400, 600, 800, 900 described herein have a housing or enclosure that is distinct from a housing or enclosure of the equipment to which the mufflers are configured to be mounted, such as by mounting screws.

Figure 8:
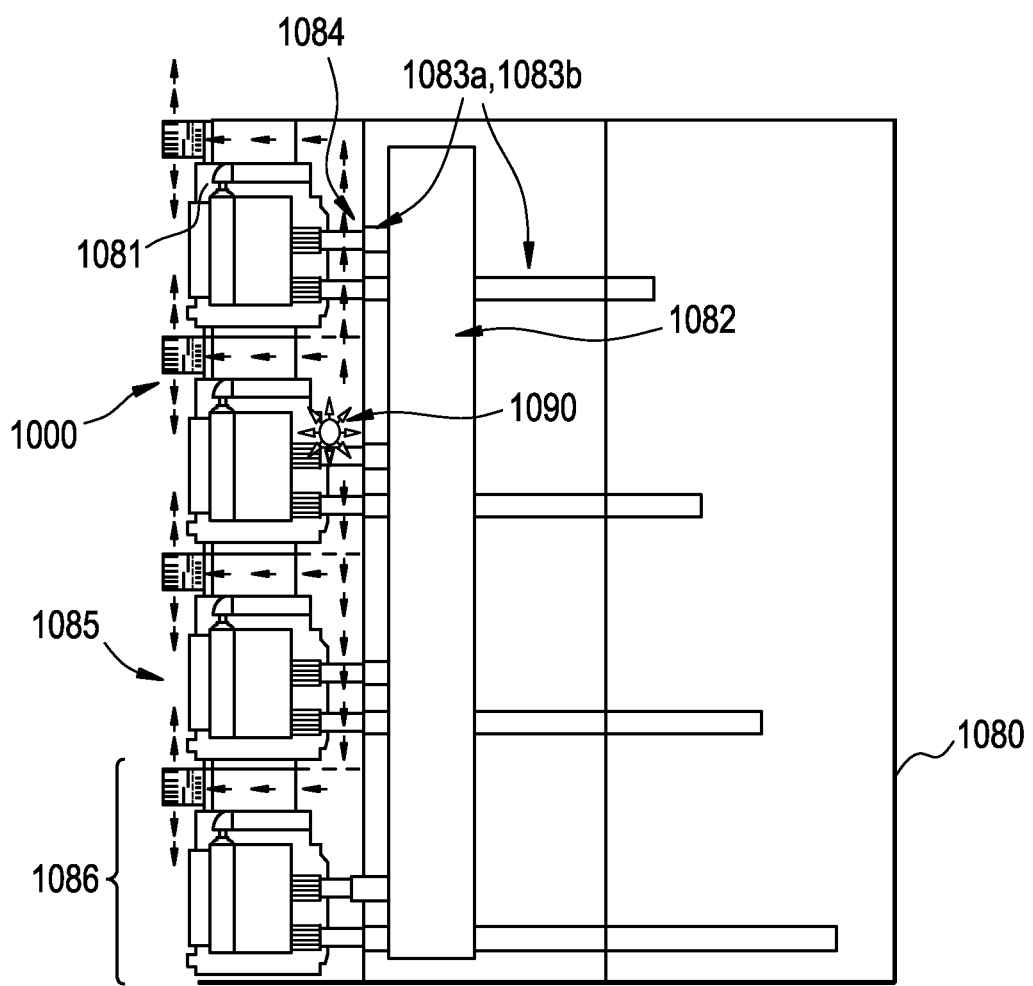
FIG. 8 is a cutaway view of a low voltage switchgear incorporating mufflers for enhanced arc protection according to an embodiment of the invention.

The mufflers described herein can be implemented in conjunction with any type of electrical equipment enclosure. For example, as shown in FIG. 8, a muffler 1000 can be mounted to a unit door 1081 of a low voltage switchgear cabinet 1080. In addition to the unit door 1081, the low voltage switchgear cabinet 1080 includes a circuit breaker compartment 1086 (which itself houses multiple circuit breakers 1085), a riser bus 1082, run backs 1083a-b, and cluster and TJM connections 1084.

Reference numeral 1090 indicates the location of an internal arc event, which is internal to the low voltage switchgear cabinet 1080, and the arrows indicate directions of travel of arc gas and plasma outside of the muffler 1000 in the case of such an event. In this embodiment, no vent openings are present on the solid front wall of the muffler 1000. Instead, vent openings of the muffler 1000 are positioned around the perimeter of its housing. Thus, the arc gas and plasma are exhausted parallel to the low voltage switchgear cabinet 1080, instead of forward toward the area where personnel could be standing.

The mufflers disclosed herein including the muffler 1000 allow a controlled expansion of arc gas and plasma. The controlled expansion includes pressure relief that reduces the stress on the door/cover, hinges and latches. Reduced stress on these door/cover parts results in less deformation. In turn, less deformation translates into a better seal, and prevention of uncontrolled release of arc gas and plasma. In addition, the mufflers disclosed herein including the muffler 1000 allow ventilation on the enclosure for components that require external cooling, and protects sensitive electronic devices.

Although shown and described with respect to a low voltage switchgear cabinet 1080, it is contemplated that any muffler disclosed herein can be implemented in conjunction any type of low- or medium-voltage equipment to provide localized pressure relief to reduce the stress level on the door and covers of enclosures during an internal arc event. For example, the muffler 1000 can be used in enclosed drives; on vented low voltage motor control center (LVMCC) enclosures; and on switchboards. In addition, any of the mufflers disclosed herein including the muffler 1000 can be adapted to be as large or small as required for the specific unit application.

Words of degree, such as "about", "substantially", and the like are used herein in the sense of "at, or nearly at, when given the manufacturing, design, and material tolerances inherent in the stated circumstances" and are used to prevent the unscrupulous infringer from unfairly taking advantage of the invention disclosure where exact or absolute figures and operational or structural relationships are stated as an aid to understanding the inventive aspects disclosed herein.

The present invention has been described in relation to particular examples, which are intended in all respects to be illustrative rather than restrictive. Those skilled in the art will appreciate that many different combinations of materials and components will be suitable for practicing the present invention.

Other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A muffler for enhanced arc protection configured to exhaust arc gas and plasma away from electrical equipment, the muffler comprising:
   a housing having an inlet, a solid front wall opposite the inlet, and a plurality of side walls that extend between the inlet and the solid front wall and define an interior space of the housing between the inlet and the solid front wall, the inlet being configured to receive arc gas and plasma exiting the electrical equipment to which the muffler is mounted; and
   internal obstructions within the interior space and dividing the interior space into multiple pathways for changing a direction of travel of the arc gas and plasma entering the inlet, the internal obstructions comprising a first perforated plate and a first baffle plate arranged in any order one behind another relative to the inlet within the interior space so as to oppose the arc gas and plasma received by the inlet, the first perforated plate and the first baffle plate being spaced apart from each other, each of the first perforated plate and the first baffle plate having a major surface which is transverse to the plurality of sidewalls, wherein at least one of the plurality of side walls comprises a vent opening out of which at least some of the arc gas and plasma is exhausted away from the muffler.

2. The muffler of claim 1, wherein the inlet is configured to be abutted against a corresponding opening of a door or panel of the electrical equipment, and wherein the vent opening is positioned such that the exiting arc gas and plasma is directed in a direction along the door or panel.

3. The muffler of claim 1, wherein the first perforated plate is positioned proximate to the inlet, and the first baffle plate is positioned proximate to the vent opening.

4. The muffler of claim 1, wherein the first baffle plate is positioned proximate to the inlet, and the first perforated plate is positioned proximate to the vent opening.

5. The muffler of claim 1, wherein the internal obstructions further comprise a second perforated plate.

6. The muffler of claim 5, wherein a perforation pattern of the first perforated plate is offset from a perforation pattern of the second perforated plate.

7. The muffler of claim 5, wherein the first perforated plate is adjacent to the second perforated plate.

8. The muffler of claim 5, wherein the first perforated plate is proximate to the inlet, and the second perforated plate is proximate to the vent opening with the first baffle plate positioned therebetween.

9. The muffler of claim 1, wherein the internal obstructions further comprise a second baffle plate adjacent to the first baffle plate.

10. The muffler of claim 9, wherein the first baffle plate is joined to one of the plurality of side walls, and the second baffle plate is joined to another of the plurality of side walls.

11. The muffler of claim 1, wherein each of the plurality of side walls comprises a vent opening.

12. The muffler of claim 1, wherein the first perforated plate comprises steel.

13. The muffler of claim 1, wherein the first perforated plate is configured to filter the arc gas and plasma.

14. The muffler of claim 1, wherein the first perforated plate comprises mesh.

15. The muffler of claim 14, wherein the mesh comprises steel.

16. The muffler of claim 1, wherein the first baffle plate is parallel to the first perforated plate.

17. The muffler of claim 1, wherein the first baffle plate is angled with respect to the first perforated plate to direct arc gas and plasma toward the vent opening.

18. The muffler of claim 1, wherein the major surface of each of the first perforated plate and the major surface lies on a plane that is perpendicular to a major surface of each of the plurality of sidewalls.

19. The muffler of claim 10, wherein the second baffle plate includes a major surface, the major surface of the first baffle plate, the second baffle plate and the first perforated plate being spaced apart from and parallel to each other in the interior space between the inlet and the solid front wall, the first baffle plate directing some of the arc gas and plasma towards the another of the plurality of side walls, the second baffle plate directing some of the arc gas and plasma towards the one of the plurality of side walls, the one and another of the plurality of walls being opposite to each other.

20. The muffler of claim 19, wherein the housing comprises a box in which the plurality of sidewalls comprises four sidewalls each having a major surface that lies on a plane that is orthogonal to the solid front wall, each of the four sidewalls including a plurality of spaced-apart vent openings.

21. The muffler of claim 20, wherein the vent openings of each of the four sidewalls comprises spaced-apart elongate openings that extend between the inlet and the solid front wall.

* * * * *